United States Patent

[11] 3,627,579

| [72] | Inventor | Carl John Heffelfinger<br>Circleville, Ohio |
|---|---|---|
| [21] | Appl. No. | 877,755 |
| [22] | Filed | Nov. 18, 1969 |
| [45] | Patented | Dec. 14, 1971 |
| [73] | Assignee | E. I. du Pont de Nemours and Company<br>Wilmington, Del.<br>Continuation-in-part of application Ser. No. 707,907, Jan. 9, 1968, now abandoned, Continuation-in-part of application Ser. No. 470,992, July 12, 1965, now abandoned. This application Nov. 18, 1969, Ser. No. 877,755 |

[54] UNIDIRECTIONALLY ORIENTED FILM STRUCTURE OF POLYETHYLENE TEREPHTHALATE
7 Claims, 7 Drawing Figs.

[52] U.S. Cl. ................................................ 117/236,
117/7, 117/121, 117/122 PF, 117/138.8 F,
117/160, 117/235, 260/75 T, 264/40, 264/210,
264/288, 264/291

[51] Int. Cl. ........................................................ H01f 10/00,
C09j 7/02, C08g 17/04
[50] Field of Search ........................................ 264/40,
288, 291, 210; 117/122, 160, 7, 121, 235, 236,
138.8 F; 260/75 T

[56] References Cited
UNITED STATES PATENTS

| 2,650,213 | 8/1953 | Hofrichter ................... | 260/75 |
|---|---|---|---|
| 3,214,503 | 10/1965 | Markwood ................... | 264/210 |
| 3,354,023 | 11/1967 | Dunnington et al. ......... | 161/165 |
| 3,361,861 | 1/1968 | Bertinotti et al. ............ | 264/210 |

Primary Examiner—William D. Martin
Assistant Examiner—B. D. Pianalto
Attorney—Claude L. Beaudoin ABSTRACT: A tear-resistant, nonfibrillating and dimensionally stabilized film structure of polyethylene terephthalate, which is useful as a backing for metallic, magnetic, and adhesive coatings, having an intrinsic viscosity of at least 0.65 and which is stretch oriented unidirectionally and a process of preparation thereof.

ONE-WAY STRETCHED POLYETHYLENE TEREPHTHALATE

ONE-WAY STRETCHED POLYETHYLENE TEREPHTHALATE

INVENTOR
CARL JOHN HEFFELFINGER

BY *Claude L. Beardoin*
ATTORNEY

INVENTOR
CARL JOHN HEFFELFINGER

BY *Claude L. Beaudoin*

ATTORNEY

INVENTOR
CARL JOHN HEFFELFINGER

UNIDIRECTIONALLY ORIENTED FILM STRUCTURE OF POLYETHYLENE TEREPHTHALATE

THE INVENTION

The present application is a continuation-in-part of copending application Ser. No. 707,907, filed Jan. 9, 1968 and now abandoned, which is in turn a continuation-in-part of copending application Ser. No. 470,992, filed July 12, 1965 and now abandoned.

The present invention relates to a novel film structure of thermoplastic polyester polymeric material and, more particularly, is directed to a novel film structure of polyethylene terephthalate and to a process of manufacture therefor.

Polyethylene terephthalate is a well-known thermoplastic polymeric material and is described in, for example, U.S. Pat. 2,465,319 to Whinfield and Dickson. It is also known to prepare shaped structures such as, for example, self-supporting films of polyethylene terephthalate by extruding the molten polymeric material through a suitable orifice followed by quenching the amorphous polymeric material in film form. Such film, although possessing many excellent inherent physical properties, is not competitive in other respects, such as, for example, tensile strength, with film structures of other types of polymeric material. Thus, as is now well known, processes have been evolved to improve the properties of polyethylene terephthalate such as, for example, by elongating, as by stretching, film structures of substantially amorphous polyethylene terephthalate whereby to orient the film structure and impart thereto greatly enhanced physical property levels. In such processes as described, for example, in U.S. Pats. 2,823,421 to Scarlett and 2,995,779 to Winter, the thermoplastic polyester material, preferably polyethylene terephthalate, is melt-extruded through an orifice to form a film which is then quenched in order to obtain a substantially amorphous film of polyethylene terephthalate. Thereafter, the amorphous film is heated to a temperature within a specified temperature range and is oriented as by stretching the film biaxially a specified amount. If desired, the biaxially stretched film may be dimensionally stabilized as by heat-setting in the conventional manner by subjecting the film to heat-setting temperatures of 150° C. to 250° C.

The prior art films of polyethylene terephthalate, prepared from conventional polymerization recipes and characterized ordinarily by a intrinsic viscosity of about 0,55, have several major serious drawbacks, and the principal drawback being that such film when oriented only unidirectionally as by stretching the film in only one direction of its two major perpendicular planar axes or directions, lacks dimensional stability, and when heat-set in order to impart dimensional stability thereto, the film fibrillates, i.e., splits along the direction of stretching, as will be more fully explained hereinafter.

It is, therefore, the principal object of the present invention to provide a novel film structure of polyethylene terephthalate.

It is a further object of the invention to provide a nonfibrillating dimensionally stabilized film structure of polyethylene terephthalate oriented substantially unidirectionally.

It is a still further object of the invention to provide a process for the manufacture of the novel nonfibrillating, dimensionally stabilized film structure of polyethylene terephthalate.

According to the present invention, there is provided a tear-resistant, nonfibrillating, dimensionally stabilized film structure of polyethylene terephthalate oriented substantially unidirectionally. The film structure is a heat-set, nonfibrillating film of polyethylene terephthalate oriented predominately uniaxially characterized by shrinkage at 105° C. not exceeding 5 percent and at least 50 percent elongation at break in the direction transverse to the direction of predominant orientation. The heat-set, nonfibrillating film structure of polyethylene terephthalate is further characterized by an intrinsic viscosity of at least 0.65, molecular orientation predominantly uniaxially by stretching preferably at least 4 X, i.e., four times its original dimension in the direction of stretch, a tensile strength of preferably at least 50,000 p.s.i. in the direction of stretching, at least 50 percent elongation in the direction transverse to the direction of stretching and a density between about 1.365 and about 1.400 grams per cubic centimeter. In one of several preferred embodiments, the film structure of the present invention is one having a coating on at least one side thereof such as an adhesive composition, a composition containing magnetizable particles or a metallic coating firmly adhered to the surface thereof.

According to the present invention, there is further provided a process for preparing a nonfibrillating, dimensionally stabilized film structure of polyethylene terephthalate oriented substantially unidirectionally which comprises elongating predominately unidirectionally an amorphous film structure of polyethylene terephthalate having an intrinsic viscosity of at least 0.65 and heat-setting said film structure to provide a film structure having a density between about 1.365 and about 1.400 grams per cubic centimeter. The continuous integrated process for preparing said film structure comprises extruding polyethylene terephthalate having an intrinsic viscosity of at least about 0.65 in film form at a temperature of 270° C. to 315° C.; quenching said extruded film structure at a temperature below 80° C. to obtain said film structure in substantially amorphous form; heating said film structure to a temperature above 80° C. and within the range for effecting molecular orientation thereof; elongating said film structure unidirectionally at least 4X at said temperature; and heating said unidirectionally elongated film structure at a temperature within the range of 150° C. to 250° C.

The nature and advantages of the film structure of the present invention will be more clearly understood by the following description and the several figures illustrated in the accompanying drawings in which.

Figure 5:
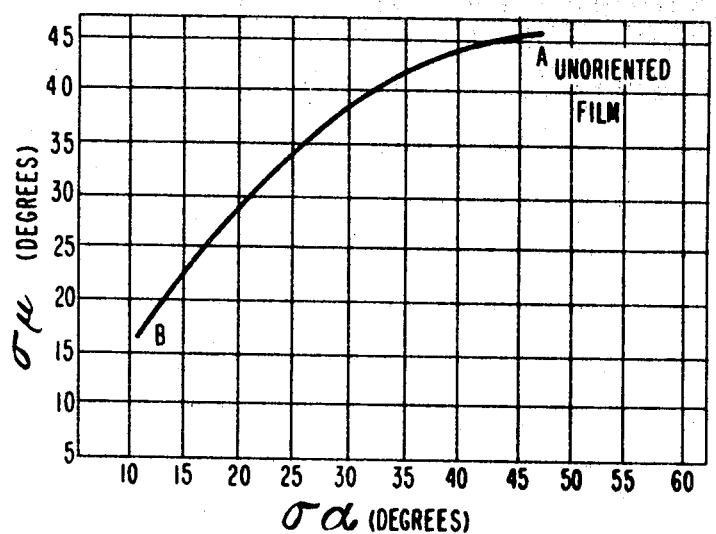
Figure 6:
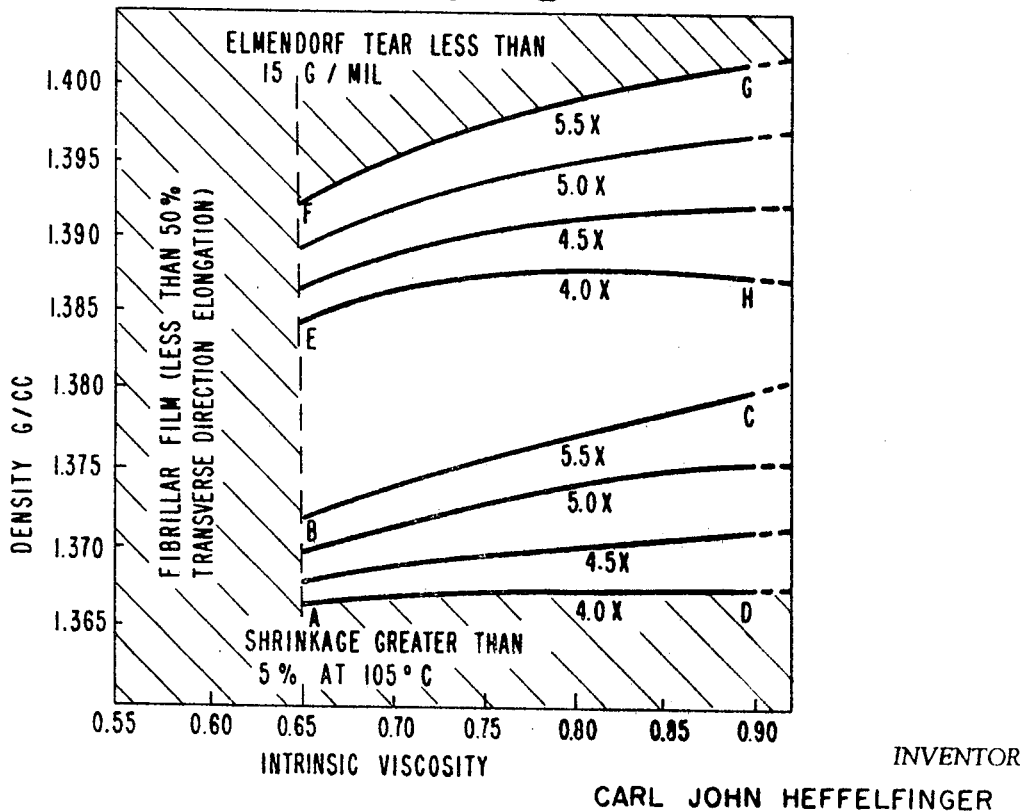
Figure 6A:
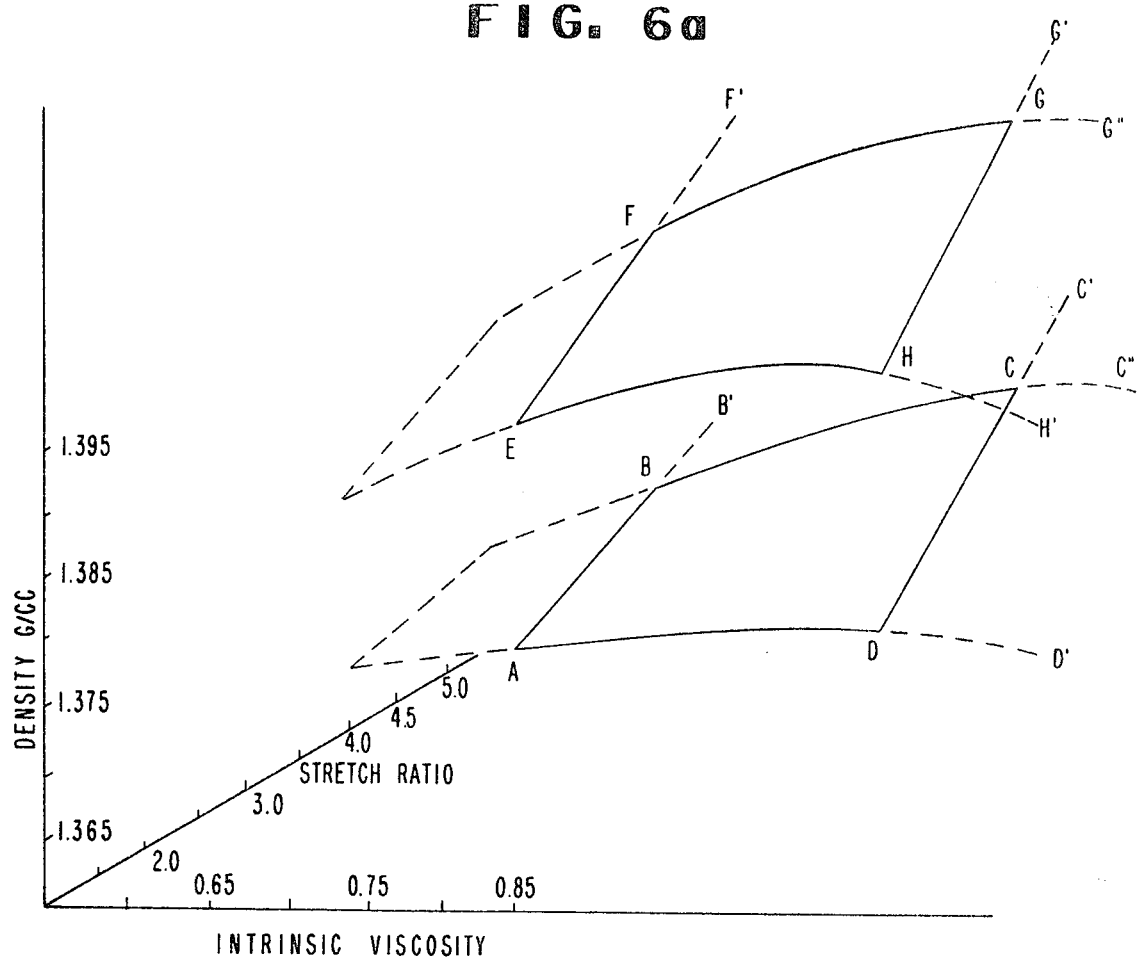

FIG. 5 graphically illustrates the effect of stretching upon the orientation parameters of the films of the present invention; and FIGS. 6 and 6a graphically illustrate a typical interrelationship of viscosity, density, and stretch ratio as regards dimensional stability and tear resistance of the films of the present invention.

Figure 1:
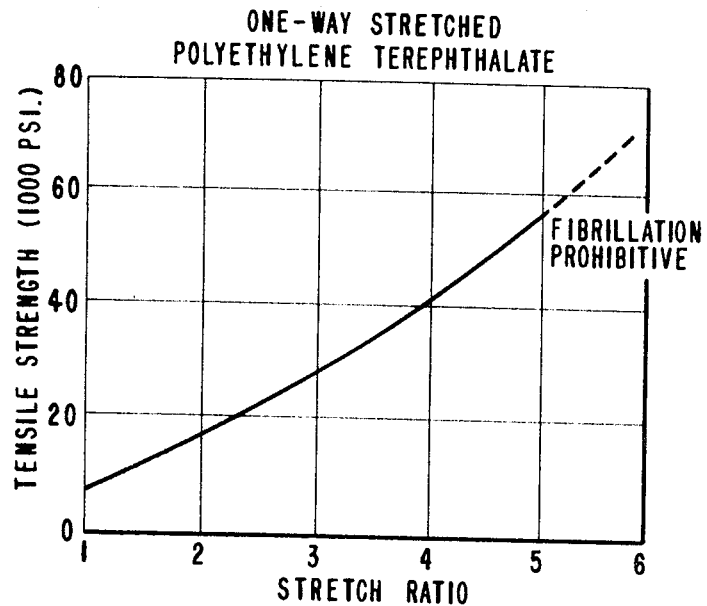
FIG 1 is a graphical illustration of a typical relationship between tensile strength and stretch ratio (extent of stretch) for unidirectionally stretched film of polyethylene terephthalate.

Referring now to FIG. 1, it is readily seen that elongating, as by stretching, a film of polyethylene terephthalate is indeed desirable from the standpoint of greatly increasing the tensile strength of the film in the direction of stretching. The results in FIG. 1 were obtained by stretching unidirectionally conventional films of polyethylene terephthalate having an intrinsic viscosity of 0.55 at a temperature of 90° C. wherein the extent of stretch covered a range of stretch ratios of from slightly greater than 1X to about 5X. The unidirectionally stretched films were not heat-set. The desirability of film stretching is readily recognized by the fact that unstretched film (stretch ratio of 1X) possesses a tensile strength less than 10,000 p.s.i., whereas, in direct contrast, a film stretched 4X possesses a tensile strength of about 40,000 p.s.i. The desirability of film stretching is further recognized by the fact that film stretched 2X possesses a modulus of 460,000 p.s.i., whereas, film stretched 5X possesses a modulus of about 1,800,000 p.s.i.

FIG. 1 also clearly illustrates the practical limitation to the extent of stretch that can be utilized for stretching conventional film of polyethylene terephthalate inasmuch that unidirectionally stretching such film above a stretch ratio greater than about 5X results in failure of the film structure as evidenced by fibrillation of such an extensive nature as to destroy completely the useful structural integrity and unitary structure of the film. Thus, conventional films of polyethylene terephthalate unidirectionally stretched greater than about 5X and possessing a unitary structure and any satisfactory levels of physical properties such as tensile strength, impact strength, dimensional stability, etc., imparting any practical usefulness thereto have not heretofore been achieved.

Unidirectionally stretched conventional films of polyethylene terephthalate possessing useful structural integrity are confined to such films as are stretched at stretch ratios below about 5X. Such films, however, lack dimensional stability and must be heat-set if to possess dimensional stability such as a shrinkage at 105° C. not exceeding 5 percent. Heat-setting does, however, have an adverse effect upon the physical properties of such film structures in that it induces fibrillation thereof.

Figure 2:
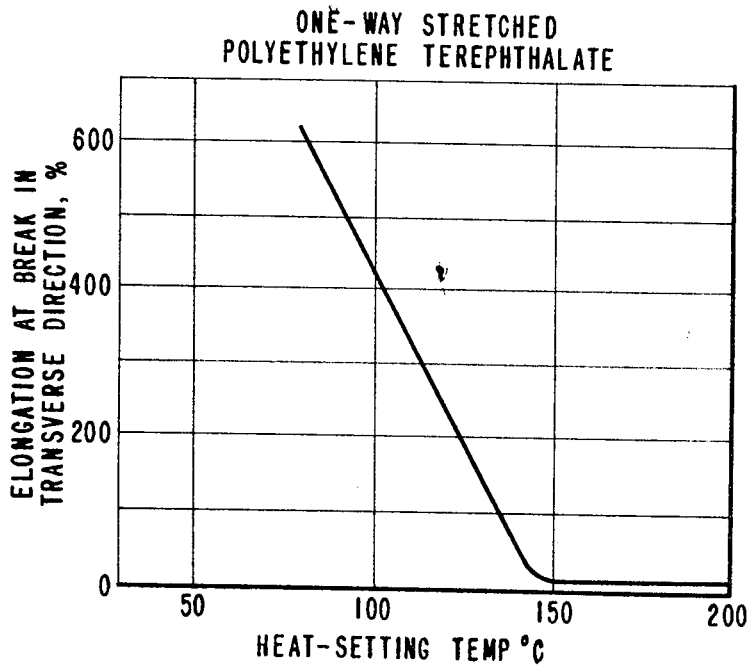
FIG. 2 is a graphical illustration of the relationship between heat-setting temperature and elongation at break in the direction transverse to the direction of predominant orientation for unidirectionally stretched film of polyethylene terephthalate.

The adverse and limiting effects of heat-setting upon the physical properties of unidirectionally stretched conventional films of polyethylene terephthalate are illustrated in FIG. 2. In FIG. 2 is shown the effect of heat-setting temperature upon the elongation at break in the direction transverse to the direction of stretching of unidirectionally stretched conventional films of polyethylene terephthalate having an intrinsic viscosity of 0.55 wherein the transverse elongation extends up to 600 percent. It is seen from FIG. 2 that the elongation at break of such film decreases significantly as the heat-setting temperature is increased. Furthermore, at a heat-setting temperature of 150° C., which is a minimum temperature necessary in order sufficiently to dimensionally stabilize the film as by a shrinkage at 105° C. not exceeding 5 percent, the transverse elongation at break is in the neighborhood of only about 5 percent to 7 percent and because of the lack of flexibility of the film at this low limitation upon elongation, the film easily splits and fibrillates when subjected to any appreciable tensile forces in the direction transverse to the direction of stretch and easily fibrillates when subjected to shock. Moreover, at the higher and more preferred heat-setting temperature levels such as 200° C., the elongation at break is even lower and the limitation due to fibrillation becomes even worse.

It has now been found unexpectedly that nonfibrillating, dimensionally stabilized and predominantly unidirectionally oriented film structures of polyethylene terephthalate characterized especially by at least 50 percent elongation at break in the direction transverse to the direction of predominant orientation and shrinkage at 105° C. not exceeding 5 percent, may be achieved. It has been found unexpectedly that a necessary and essential feature of such film structures resides in the combination of polyethylene terephthalate having an intrinsic viscosity of at least 0.65 and predominant orientation in one direction thereof. Film structures of polyethylene terephthalate having an intrinsic viscosity of at least 0.65 and oriented predominantly unidirectionally and dimensionally stabilized are characterized by a combination of high tensile strength in the direction of predominant orientation, preferably at least 50,000 p.s.i., excellent dimensional stability evidenced by shrinkage at 105° C. not exceeding 5 percent and surprising and unexpected pneumatic impact strength and elongation, preferably at least 50 percent at break, in the diction transverse to the direction of predominant orientation.

Figure 3:
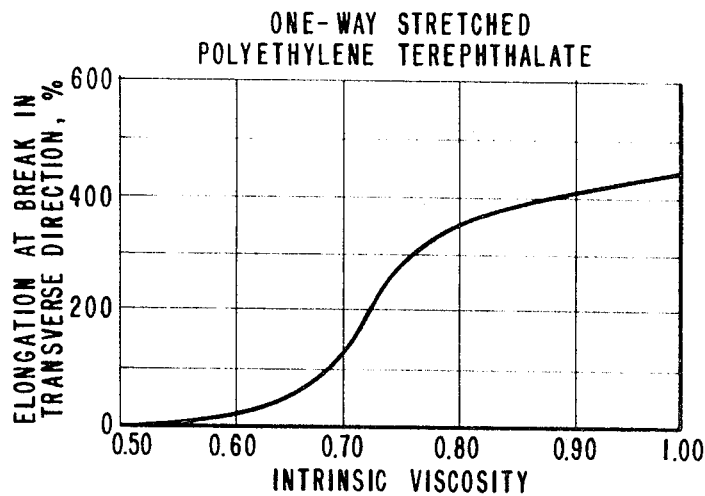
FIG. 3 is a graphical illustration of a typical relationship between elongation in the direction transverse to the direction of predominant orientation and intrinsic viscosity for unidirectionally stretched heat-set film of polyethylene terephthalate.

The unexpected and totally surprising elongation characteristics in the direction transverse to the direction of predominant orientation of the film structure of the present invention is shown in FIG. 3 in which the percent elongation at break is plotted versus the intrinsic viscosity of polyethylene terephthalate film stretched unidirectionally at a stretch ratio of 4X and a temperature of 90° C., and heat-set at 150° C. It is seen from FIG. 3 that the percent elongation at break in the direction transverse to the direction of predominant orientation of unidirectionally stretched conventional film structures of polyethylene terephthalate having an intrinsic viscosity of about 0.5 is only about 10 percent; the relationship between elongation at break and intrinsic viscosity increases gradually in a linear fashion to an intrinsic viscosity of about 0.63 to 0.65 at which point the percent elongation at break is about 25 percent. Above an intrinsic viscosity of about 0.63 to 0.65, the percent elongation at break increases rapidly exhibiting a marked steep slope and at an intrinsic viscosity of 0.75 the elongation at break is about 260 percent.

Figure 4:
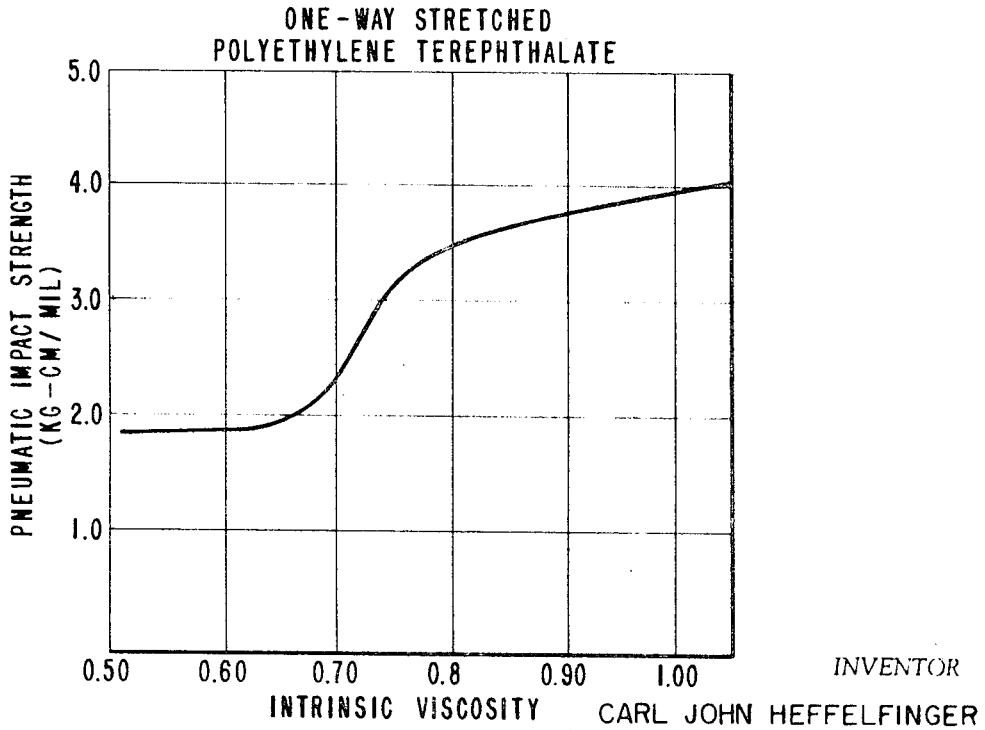
FIG. 4 is a graphical illustration of a typical relationship between pneumatic impact strength and intrinsic viscosity for unidirectionally stretched heat-set film of polyethylene terephthalate.

The unexpected and totally surprising pneumatic impact strength of the film structure of the present invention is shown in FIG. 4 in which the pneumatic impact strength is plotted versus the intrinsic viscosity of polyethylene terephthalate film stretched unidirectionally at a stretch ratio of 4X and at a temperature of 90° C., and heat-set at 150° C. It is seen from FIG. 4 that the pneumatic impact strength of unidirectionally stretched conventional film structures of polyethylene terephthalate having an intrinsic viscosity of about 0.5 is about 1.8 Kg.-cm./mil; the relationship between pneumatic impact strength and intrinsic viscosity increases gradually in a linear fashion to an intrinsic of about 0.65 at which point the pneumatic impact strength is about 2.0. Above an intrinsic viscosity of about 0.65, the pneumatic impact strength increases rapidly exhibiting a marked steep slope and at an intrinsic viscosity of 0.75 the pneumatic impact strength is about 3.5 Kg.-cm./mil.

The resistance to fibrillation of the film structure of the present invention is illustrated dramatically by the following properties, namely, the percent elongation at break in the direction transverse to the direction of predominant orientation, the pneumatic impact strength and the resistance to tear along the axis of orientation. The first property above mentioned is measured when applying a slowly increasing stress to the film and the latter two properties above mentioned are measured by applying a high rate of stress to the film. It is significant that the response to each of these tests is parallel, as shown in FIGS. 3 and 4. With regard to the present elongation at break, an elongation of at least 50 percent is a critical level, because film structures thereby characterized can tolerate a resultant stress caused by an imbalance of a unidirectional load applied across the film width, e.g., as at right angles to the measured elongation, without splitting or fibrillating.

It is seen from the foregoing that the novel polyethylene terephthalate film structures of the present invention are characterized by a combination of unique features not found in or possessed by known prior art films. The film structures of the present invention are further characterized by numerous advantages including advantages inherent in the film structure per se, advantages associated with the production of the film structure and advantages derived from the use of the film structure. At least one illustrative inherent advantage of the film structure resides in the combination of very high tensile strength in the direction of predominant orientation, preferably at least 50,000 p.s.i., and absence of fibrillation as exhibited by preferably at least 50 percent elongation at break in the direction transverse to the direction of predominant orientation, in further combination with dimensional stability as exhibited by preferably shrinkage at 105° C. not exceeding 5 percent. This is no less remarkable considering the fact that prior art unidirectionally stretched films of polyethylene terephthalate having an intrinsic viscosity of 0.55 and a tensile strength above 50,000 p.s.i. in the direction of stretch fibrillate, as evidenced often by "shattering" during the stretching step itself, and if surviving the stretching step, upon heat-setting, Another advantage of the film structure of the present invention is readily apparent when it is contrasted to prior art asymmetrically oriented film—the only known dimensionally stable film of enhanced tensile strength achieved by stretching—in that the film structure of the present invention may be produced in essentially a one-step stretching operation instead of the usual two-step operation for symmetrically oriented film, with accompanying savings in both time of operation marking possible greater rates of production and lower cost of apparatus and associated equipment necessary for the operation.

The characteristics of the film structure of the present invention above described render it eminently suitable as, for example, a video tape, a sound recording tape and an adhesive tape, etc., and other applications requiring high unidirectional strength, no fibrillation and excellent dimensional stability. When utilized as a sound recording tape, the film structure is coated on at leas on side with a composition containing magnetizable particles dispersed in a suitable binder material such as, for example, vinyl-type copolymers and having suitable adhesive agents, if necessary, incorporated therein in order to adhere firmly the magnetic particle containing composition to the film structure. The film structure of the present invention is also eminently suitable as a metallized film structure having a metallic coating on at least one side thereof preferably deposited thereon by vapor deposition techniques known to the art.

An important feature of the film of the present invention resides in its application as very thin gauge film in the construction of compact capacitors having good electrical properties. Heretofore, biaxially oriented, heat-set film because of its dimensional stability and nonfibrillating property was used for this application. Conventional uniaxially oriented film, i.e., one-way stretched film, has not, however, met with acceptance due to its tendency to fibrillate after heat-setting since, as mentioned above, such film would not have suitable dimensional stability unless it were heat-set. The film of the present invention, on the other hand, being predominantly uniaxially oriented and heat-set, but without the characteristic of fibrillation is well adapted for capacitor fabrication. Furthermore, by use of high stretch ratios possible with the film of the present invention, the stiffness, or flexural modulus of the film is increased, enabling the employment of thinner gauges without creating difficulties in capacitor winding machinery.

The process provided by the present invention essentially comprises elongating predominantly unidirectionally an amorphous film structure of polyethylene terephthalate having na intrinsic viscosity of at least 0.65 followed by heat-setting said film structure whereby to form a nonfibrillating, dimensionally stabilized film of polyethylene terephthalate oriented substantially unidirectionally. The continuous integrated process of the present invention for producing a nonfibrillating, dimensionally stabilized film structure of polyethylene terephthalate oriented substantially unidirectionally comprises extruding polyethylene terephthalate having an intrinsic viscosity of at least 0.65 in film form at a temperature of about 270° C. to 315° C.; quenching said extruded film to a temperature below 80° C. to obtain said film in substantially amorphous form; heating said film to a temperature above 80° C. and within the range for effecting molecular orientation thereof, elongating said film unidirectionally preferably to at least four times its initial dimension in said direction of elongation; and heating said unidirectionally elongated film while maintaining it under restraint at a temperature within the range of 150° C. to 250° C.

The unidirectional orientation of the substantially amorphous film structure of polyethylene terephthalate is achieved by elongating the film structure as by stretching the film structure in one direction only of its two major planar axes or directions. Orientation is a structural characteristic utilized to impart useful properties to polymeric films such as, for example, to develop useful electrical, optical and mechanical properties. Uniaxial orientation of film structures of the present invention was accomplished by stretching the film between slow and fast nip rolls, or by passing it over a series of idler rolls between a slow driven roll and a fast driven roll whereby the film is elongated in a single step, but for higher stretch ratios, e.g. 6X it is preferably done in two stages, and carried out at a temperature above the glass transition temperature (sometimes referred to as the apparent second order transition temperature) and below the crystal melting point, and at a rate of at least 1000 percent per minute. The X-ray method of Heffelfinger, et al., J. Applied Polymer Science 9 2661 (1965), for determining crystallite orientation provides a measure of orientation in oriented films. The above-mentioned method covers determination of the distribution of orientation of the long axis of polyethylene terephthalate crystallites with respect to the direction of stretch; this average value is designated as in-plane $\sigma a$ (sigma$_a$). The parameter $\sigma u$ (sigma$_u$) is a measure of the average angle of orientation of crystallite (100) planes with respect to the plane of the film. For a collection of perfectly one-way oriented crystallites the long axis in-plane $\sigma a$ would be 0°, for an unoriented amorphous film or a film of perfectly balanced biaxially orientation, $\sigma a$ would be 45°. Similarly, in practice $\sigma u$ varies between 0° (perfect alignment of the (100) crystallite plane with respect to the plane of the film) and 45°, a perfectly random orientation of these planes with the plane of the film. In measuring these parameters for uniaxially stretched films, the incident X-ray beam is directed at the sample held in a Single Crystal Orienter according to Heffelfinger, et. al. (op. cit.) so that the Bragg angle is 17.35° ((010) plane) for in-plane $\sigma a$ determination, and 25.75° ((100) plane) for $\sigma u$ determination. The sample, a small stack of film prepared in a prescribed manner as described in Heffelfinger et al. (op. cit.) is rotated for the in-plane a determination in a plane at a fixed angle to the incident beam, i.e., about its chi axis after having fixed the appropriate setting angle for the angle phi, an angle which specifies the position of the sample in a plane containing the beam and the detector. This plane is also perpendicular to the aforementioned plane at a fixed angle to the incident beam. For $\sigma u$, the Bragg and chi angles are set appropriately, and a rotation about the phi axis is then performed. The intensities of scattered radiation are measured as a function of the angle chi or phi, as the case may be. The intensity of scattered radiation at each angle is a function of the number of elements oriented at that angle.

A plot of sigma values a function of stretch ratio for stretching under a specific set of conditions yields a pattern as shown in FIG. 5. Stretching along line AB in the first direction, starts from unoriented film with in-plane $\sigma a = 45°$ and $\sigma u = 45°$. The value of each of these functions decreasing with increasing uniaxial stretching. Thus, it is seen that a and u provide a measure of the extent of crystallite orientation effected by stretching.

The orientation parameter, $\sigma ai$ (sigma a, in-plane) which is a measure of the inclination of the long crystallite axis to the direction of orientation is indicative of the degree of axial orientation. It was found that polyethylene terephthalate films having an intrinsic viscosity of 0.65 when stretched 3.0X had an in-plane a of 32°–33°, and when stretched 3.5X had ai values of 28° to 30°; similar films oriented 4.0X had ai values less than 25°.

A strength-imparting feature of a high tenacity film is derived from the parallel alignment of crystallites, which have a high degree of order with the axes parallel to the direction in which high strength is evident. It would be expected that the highly ordered parallel structure would possess little durability in the direction in the plane of the film perpendicular to the direction of orientation. So it is with films of the prior art in which the structure has been stabilized by crystallization (heat setting); such films tend to fibrillate and have such poor properties that they are of little value for most purposes. It is known in the art that a small degree of transverse orientation can effectively eliminate this tendency to fibrillate, although at the expense of additional process steps or limitations, but without the achievement of the ultimate in properties in the direction or principal orientation since a second direction stretch disturbs the parallel alignment of crystallites and diminishes the high tensile strength of the first direction stretch. Amborski, U.S. Pat. No. 2,975,484, imparts a small degree of transverse stretch. In the present invention it is found that transversely tough film can be produced without these expedients. The stretch ratio employed is preferably greater than 4X in order to obtain a film structure having a tensile strength in the direction of stretching of at least 50,000 p.s.i. and which is, therefore, useful in applications where high stress is encountered.

The salient features of the present invention will better the understood by reference to FIGS. 6 and 6a. The data of FIGS. 6 and 6a were obtained by analysis of a total of 97 samples of film of thickness between 0.24 mils and 1.78 mils with a range of intrinsic viscosity from 0.53 to 0.90, a range of stretch ratio from 3.0X to 5.3X and heat-set to a density ranging from 1.3420 g./cc. to 1.3979 g./cc., the samples distributed over the range of variables were prepared and the samples examined for the effect of these variables on dimensional stability at 105° C. and Elmendorf tear. These data were supplied to a computer with the limits of 5 percent shrinkage in air at 105° C. and greater than 15 grams per mil. Elmendorf tear (along axis of orientation).

The FIG. of viscosity, stretch ratio and 5.5X, to the physical properties, dimensional stability and tear resistance is shown in FIGS. 6 and 6a. In FIG. 6 areas below the lines representing various stretch ratios, 4.X, 4.5X, 5.X and 5.5X, respectively, exhibit shrinkages greater than 5 percent at 105° C., and are thus unacceptable for the uses of the present invention. In a like manner, those films in the region above lines representing films stretched 4X, 4.5X, 5.0X and 5.5X, respectively, do not possess sufficient tear resistance, that is, the higher density films of this region and tend to readily tear along the axis of orientation as evident from Elmendorf tear values of less than 15 grams per mil. thickness. Reference to FIG. 6a will show that the range of permissible densities is bounded in the lower level by surface (ABCD), and in the upper level by similar surface (EFGH) to form an irregular volume (ABCDEFGH) which may be extrapolated along planes BCGF and DCGH, e.g., B'C'G'F'. Line AD in FIG. 6a corresponds to the 4.0X stretch line in the lower family of stretch lines in FIG. 6. Similarly, lines EH and FIG. in FIG. 6a correspond to the 4.0X and 5.5X stretch lines, respectively, in the upper family of stretch lines in FIG. 6.

Accordingly, by reference to FIG. 6 and FIG. 6a, it can be seen that careful selection of the combination of conditions and parameters is essential in order to obtain a higher tenacity film which has the requisite dimensional stability and maintains its integrity without fibrillation or tearing during processing and subsequent use. For example, if a high tensile strength, as in the region of 60,000 pounds per square inch and a shrinkage of less than 5 percent at 105° C. is desired, coupled further with orientation by stretching up to 5.0X of a film having a polymer intrinsic viscosity of 0.75, then a density of 1.371 is required. A stretch ratio of 4.0 and a viscosity of 0.65 could tolerate a lower density, but not provide the desired tenacity. The upper density limits to avoid tearing would also involve limits determined in a similar manner.

By reference to FIGS. 6 and 6a, it is apparent that the present invention enables the production of films of high dimensional stability coupled with high tensile properties. Heretofore, films of higher densities were unsuitable, although they were of high dimensional stability, because such films tend to be brittle ad tear readily. The present invention enables the attainment of higher densities without embrittlement or tearing, as indicated on the region enclosed by the upper curves delineating the boundaries at various stretch ratios between the density of films have acceptable and unacceptable tear resistance, and the lower curves, delineating the boundary a various stretch ratios between acceptable and unacceptable dimensional stability, each curve being a function of polymer viscosity in the film, and the stretch ratio. All films must be above an intrinsic viscosity of 0.65, the threshold for fibrillation resistance of films having densities sufficient for dimensional stability (5 percent or less shrinkage at 105° C.). The lowest suitable value for stretch ratio for the purposes of films of the present invention is 4X which produces a film with a tensile strength of at least 50,000 p.s.i.

The temperature at which the film structure is elongated is any temperature within the range for effecting molecular orientation, namely, above the second order transition temperature and below the crystalline melting point of the polymeric material, e.g., above 80° C. and below 250° C. The temperatures employed for elongating and heat-setting the film structure of the present invention are achieved and maintained by any suitable means such as conduction, convection, or radiation as, for example, directing a heated gaseous medium onto the film structure or contacting the film structure with heated surfaces or employing radiant heaters.

The film structure of present invention must be dimensionally stabilized, ordinarily referred to as heat-setting, by subjecting the film for a short duration to a temperature above 150° C. and preferably in the range of 150° C. to 250° C. It is necessary that the film structure be heated to at least 150° C. in order to achieve a dimensional stability thereof characterized by shrinkage at 105° C. not exceeding 5 percent.

The degree of restraint or relaxation during heat-setting is determined by the properties required for the intended use or function of the film. For high modulus films, for uses requiring high stiffness and low elongation under load, total restraint during heat-setting is essential. There is little tendency of the film structure of the present invention to shrink in width during heat-setting; preferably, however, restraint is applied in all directions coplanar with the film structure. Film for applications where thermal dimensional stability is a primary consideration, such as metallic yarn and collar stays, relaxation in the direction of principal orientation (the direction in which the principal shrinkage or relaxation occurs) is permitted up to 25 percent, depending upon the balance of thermal dimensional stability and tensile properties desired.

The polymeric ethylene terephthalate material employed in the process of the present invention may be obtained in the manner set forth in any one of U.S. Pat. Nos. 2,465,319, 2,534,028, and 2,727,882, and is melt-extruded at a temperature above 270° C. through a suitable orifice in the conventional manner followed by quenching below 80° C. in order to obtain the polymeric material in amorphous film form.

The principle and practice of the present invention will now be illustrated by the following examples which are provided to show an embodiment of the integrated process contemplated thereby, but it is not intended that the invention be limited thereto since modifications in technique and operation will be apparent to anyone skilled in the art.

EXAMPLE 1

Ethylene terephthalate polymer prepared by solid phase polymerization substantially in accordance with the process described in U.S. Pat. No. 2,534,028 to Izard and having an intrinsic viscosity of 0.85 is conducted from the final polymerization vessel into a conventional extrusion apparatus wherein it is maintained at 280° C. and is extruded through an orifice and onto a quench drum maintained at 60° C.

A 4-inch square sample of the film e.g., having a thickness of 5 mils, is placed in a frame stretcher. The film sample is held securely along two parallel edges by one each of the two stationary sides of the frame stretcher and the other two edges of the film sample are each held securely by one of the two movable sides of the frame stretcher. The film sample in the frame stretcher has an effective dimension for stretching of 3 inches along each edge thereof held by the frame stretcher. The film sample is heated in an oven to a temperature of 97° C. and is stretched in one direction only to a length of 12 inches by moving apart the two movable sides of the frame stretcher at a stretching rate of about 21,000 percent per minute.

The film sample stretched unidirectionally at a stretch ratio of 4X is held under total restraint in frames and heat-set by subjecting the film to heated air of 150° C. for about 3 minutes.

If the foregoing procedure is repeated using polyethylene terephthalate of different intrinsic viscosity and the same conditions of temperature and stretching except as specified in the table below, and the properties of each film sample are evaluated, average values will be obtained which are also presented in the table herebelow:

TABLE 1

| Intrinsic viscosity | Unidirectional stretch ratio | Heat setting temp., ° C. | Density, g./cc. | Transverse disection elongation, percent | Pneumatic impact strength, km.-cm./mil. | Birefringence |
|---|---|---|---|---|---|---|
| 0.55 | 4X | 150 | 1.3772 | 7 | 1.85 | 0.1134 |
| 0.68 | 4X | 150 | 1.3783 | 67 | 2.09 | 0.1103 |
| 0.74 | 4X | 150 | | 248 | 3.66 | |
| 0.87 | 4X | 150 | 1.3767 | 307 | 3.62 | 0.1096 |
| 1.0 | 4X | 150 | 1.3704 | 325 | 4.08 | 0.1048 |
| 1.18 | 4X | 150 | | | 4.84 | 0.0942 |

EXAMPLE 2

Polyethylene terephthalate film having an intrinsic viscosity of 0.65 was unidirectionally oriented by passing the film structure through slow, idler and fast rolls under the following conditions:

| | |
|---|---|
| a. slow roll temperature | 100° C. |
| b. idler roll temperature | 97° C. |
| c. heat-set roll temperature | 180° C. |
| d. slow roll speed | 6.5 feet per minute |
| e. fast roll speed | 35.8 feet per minute | and the major physical property in the direction of stretching of the resulting film structure were as follows:

| | |
|---|---|
| Modulus | 2,000,000 p.s.i. |
| Elongation under load of 35,000 p.s.i. | 2.1 percent |
| Tensile strength | 70,000 p.s.i. |

EXAMPLE 3

Cast polyethylene terephthalate film having an intrinsic viscosity of 0.83 was unidirectionally oriented by nip roll stretching under the following conditions: (a) preheat temperature 90° C., (b) slow roll temperature 89° C., (c) fast roll temperature 86° C., (d) heat set roll temperature 177° C., (e) slow roll speed 12.5 feet per minute, (f) fast roll speed 56.25 feet per minute. The film structure was permitted to relax 2 percent in the direction of orientation between the heat set roll and the quench roll. The major physical properties of the relaxed film were as follows: MD Tensile Strength 64,000 p.s.i.; MD Dimensional Stability at 105° C. 1 percent; MD Dimensional Stability at 160° C. 8.8 percent; TD Elongation at Break 322 percent.

The expression "elongation under load" used herein is commonly known as creep and in many applications, namely, plastic piping, is a critical property. In use, piping is ordinarily constantly under stress due primarily to the pressure of the fluid medium contained or transported therewithin. If the components of the piping such as the film structure above noted were to elongate, then obviously the piping would extend or otherwise become distorted from its intended configuration. The film structure of the present invention is especially adapted to application as piping by virtue of the low creep values attainable by unidirectionally stretching the film structure utilizing high stretch ratio followed by heat-setting at a high temperature without fibrillation. As above noted, prior art one-way stretched films, heat-set to achieve low creep, fibrillate so badly that they cannot be effectively employed. Furthermore, the film structures of the present invention have lower creep than even the best of the prior art films, i.e., tensilized polyethylene terephthalate which is manufactured by stretching in each of two mutually perpendicular directions, heat-setting followed by poststretching with a second and final heat-setting step, To illustrate a film held under a stress of 5,000 pounds per square inch (p.s.i.), with elongation values extrapolated to 100,000 hours, revealed that the tensilized polyethylene terephthalate film (intrinsic viscosity of 0.57) elongated 0.66 percent while film of the present invention (intrinsic viscosity of 0.65) elongated only 0.35 percent. Experience shows that increasing the load causes even wider divergence, to the extent that even the prior art film is unusable at the required 35,000 p.s.i. loading. Normal testing of films of the present invention is accomplished by loading, e.g., at 35,000 p.s.i., and measuring the length of film subjected to stress and the elongation thereof as a function of time by means of an extensometer attachment coupled to an Instron tensile testing machine (Model TT-B, Instron Engineering Company, Quincy Massachusetts). An initial accommodation or elongation is normally observed, but with the film of the present invention, of intrinsic viscosity of 0.65, stretched one-way and heat-set at 150° C., creep is as low as 2 to 3½ percent at 10,000 hours, Higher creep values cannot be tolerated in pipe construction.

The capacity of a film to resist shrinkage when exposed to heat at elevated temperatures also is a critical property in many applications. For example, in some magnetic tape applications temperatures may rise to 60° C. and higher and if the tape shrinks more than about 2 percent, severe distortion of recorded information ordinarily occurs; furthermore mechanical difficulties in handling arise if the shrinkage occurs on a roll of tape, such as, cinching of the tape on the roll. A measure of the dimensional instability is obtained by hanging a film sample unrestrained in an oven at the desired temperature and the percentage shrinkage is computed from the initial and final film dimensions. It is expedient to make this determination at slightly higher temperatures, for example at 105° C. where a 5 percent shrinkage is the maximum tolerable. Similar considerations apply to metallized yarn, wherein high thermal shrinkage would be intolerable, and especially to piping wherein the temperature of contained fluids may be sufficient to cause shrinkage and distortion of piping networks.

As used herein tensile strength is intended to mean the force or pull per unit of cross-sectional area, expressed in pounds per square inch, which is required to break the film at room temperature. Elongation is the extent to which the film will stretch before breaking when subjected to unidirectional stress at 100 percent elongation per minute. Tensile modulus, or initial tensile modulus, usually referred to as simply modulus and expressed as pounds per square inch, is the slope of the stress-strain curve at 1 percent elongation as the film is being elongated at 100 percent per minute. The three film tensile properties were determined by use of an Instron tensile testing machine (Model TT-B, Instron Engineering Co., Quincy, Mass.). using a sample length of film of 2 inches having a width of 1 inch, and elongating the sample at a rate of 100 percent per minute. The apparatus produces a load elongation chart from which the appropriate values may be calculated.

The pneumatic impact strength, that is, the resistance to fracture upon sudden shock, is a critical film property in many applications such as, for example, piping. Sudden surges in piping systems, such as that typified by water-hammer resulting from the rapid closing of valves, could have a disastrous effect such as rupturing the piping structure. Film structures of the present invention are characterized by enhanced pneumatic impact strength and, accordingly, are useful in piping applications.

Pneumatic impact strength is the energy required to rupture a film and its measured in kilogram-centimeters/mil. of thickness of the film sample. Pneumatic impact strength is determined by measuring the velocity of a projectile, mechanically accelerated by air pressure, first in free flight and then in flight immediately after being impeded by rupturing the film test sample. In this test, the film sample is 1¾ inch ×1¾ inch and the projectiles are steel balls ½-inch in diameter and weighing 8.3 grams. The free flight velocity of the ball is 40 ±2 meters per second. The velocities are measured by timing photoelectrically the passage of the steel balls between two light beams set a known measured distance apart. The pneumatic impact strength is measured by the loss in kinetic energy of the ball due to rupturing of the film sample and it is calculated from the following formula:

$$P = K(V_f^2 - V_i^2)$$

wherein:

P is pneumatic impact strength
K is a constant
$V_f$ is velocity of steel ball in free flight
$V_i$ is velocity of steel ball in impeded flight.

The constant K is directly proportional to the weight of the projectile and inversely proportional to the acceleration due to gravity.

The intrinsic viscosity of polyethylene terephthalate of the present invention is determined in a trifluoroacetic acid-methylene chloride solvent system, since dissolution times are prohibitively long in the tetrachloroethane-phenol solvent system used for conventional polyethylene terephthalate. For this determination the relative viscosity (nr) of the present polymer is determined in a 1 percent solution at 30° C. in a solvent comprising 25 parts by weight trifluoroacetic acid (TFA) and 75 parts by weight methylene chloride ($CH_2Cl_2$). The relative viscosity in this solvent (relative viscosity is the flow time of the solution through a capillary viscometer divided by the flow time of the solvent) is converted to the relative viscosity which would be obtained in a conventional solvent of 0.6 parts by weight 1,1,2,2-tetrachloroethane (TCE) and 1 part by weight phenol. Using the empirical equation $nr(TCE\text{-}phenol) = 1.0324\ nr(TFA\text{-}CH_2CL_2) - 0.19$, the relative viscosity in TCE-phenol is calculated. From this relative viscosity the intrinsic viscosity is determined from the experimentally constructed table:

INTRINSIC VS. RELATIVE VISCOSITY

POLYETHYLENE TEREPHTHALATE IN TCE/PHENOL

| Relative | Intrinsic | Relative | Intrinsic |
|---|---|---|---|
| 1.20 | 0.19 | 1.82 | 0.64 |
| 1.30 | 0.26 | 1.84 | 0.66 |
| 1.40 | 0.34 | 1.86 | 0.67 |
| 1.50 | 0.42 | 1.88 | 0.68 |
| 1.52 | 0.44 | 1.90 | 0.70 |
| 1.54 | 0.46 | 1.92 | 0.71 |
| 1.56 | 0.48 | 1.94 | 0.73 |
| 1.58 | 0.49 | 1.96 | 0.73 |
| 1.60 | 0.50 | 1.98 | 0.75 |
| 1.62 | 0.51 | 2.00 | 0.76 |
| 1.64 | 0.53 | 2.04 | 0.78 |
| 1.68 | 0.55 | 2.08 | 0.80 |
| 1.70 | 0.56 | 2.12 | 0.82 |
| 1.72 | 0.57 | 2.16 | 0.85 |
| 1.74 | 0.58 | 2.20 | 0.87 |
| 1.76 | 0.60 | 2.30 | 0.93 |
| 1.78 | 0.61 | 2.40 | 0.98 |
| 1.80 | 0.62 | 2.42 | 1.00 |

(This table is extrapolated for relative viscosities above 2.42 (intrinsic greater than 1.00).

The birefringence of the polymeric film structures of the present invention is determined by subtracting the refractive index measured in the direction transverse to the direction of stretching of the film structure from the refractive index measured in the direction of stretching. The refractive index is measured by means of a Zeiss refractometer, employing a high refractive index liquid such as diodomethane to wet the interface between the film and the optics of the instrument.

The unidirectionally oriented polyethylene terephthalate film structures of the present invention can be employed in the manufacture of conveyor belting; power belting (V-belts); plastic rope; abrasive belting; apparel stays; audit magnetic tape; piping; strapping tape and bands; metallic yarn; capacitor film; photographic film; insulation for distribution transformers; wire and cable insulation; cross-lapped structures for rigid panels (laminates); filled films filled with opacifiers and used as drafting films); pressure sensitive tapes; films primed with elastomeric material for fabricating power belting and heat-sealable bands coated with polyethylene.

The present invention has been described and exemplified with particular reference to polyethylene terephthalate and it is to be understood that the invention comprehends films by any synthetic, linear terephthalate ester polymer derived by reacting a glycol of the formula $HO(CH_2)_nOH$, wherein $n$ is an integer from two to 10 inclusive, terephthalic acid or an ester forming derivation thereof or a low molecular weight alkyl ester thereof, and from 0 to 20 percent by weight of a second acid or ester thereof wherein said second acid includes isophthalic acid, bibenzoic, sebacic acid, hexahydroterephthalic acid, adipic acid, azaleic acid, naphthalic acid, and 2,5-dimethyl-terephthalate acid.

A unique feature of the present invention is the provision of a film of extremely high tensile strength which is resistant to shrinkage at elevated temperatures and which is of superior durability with respect to fibrillation or tear along the axis of the direction of orientation. In view of Amborski, USP 2,975,484, which states that film stretched greater than 4X is only one direction fibrillates, it is especially surprising that this can be achieved by one way stretching; it is done by employing polyethylene terephthalate above an intrinsic viscosity of 0.65, by stretch orienting in one direction only to at least 4 times its initial length, and heat setting to achieve density within a specific range, as imposed by the combination of molecular weight and a stretch ratio employed. The density range has been found to be between 1.365 g./cc for the lowest operable viscosity and stretch ratio combination (intrinsic viscosity of 0.65 and stretch ratio of 4.0X) to a maximum slightly above 1.400 g./cc. (for stretch ratios above 5.5X and viscosity above 0.90) such as the film illustrated by the examples herein. The lower limit of density is that limit below which the particular film structure will not have the requisite thermal dimensional stability (not more than 5 percent shrinkage in the direction of orientation at 105° C.); the upper limit of density is that at which splitting or tearing along the axis of orientation becomes excessive. This latter phenomena is measured as Elmendorf tear strength (by the method ASTM D-1922-61-T) which measures the resistance to tear upon application of opposed forces acting along a line perpendicular to the film surface. A practical minimum for most film uses is found to be 15 g./mil. (0.001 in.).

What is claimed is:

1. A nonfibrillating, heat-set and dimensionally stabilized film structure of polyethylene terephthalate having an intrinsic viscosity of at least 0.65 and molecularly oriented predominantly uniaxially by stretching at least 4X, and characterized further by a tensile strength of at least 50,000 p.s.i. in the direction of stretching, and at least 50 percent elongation in the direction transverse to the direction of stretching, and a shrinkage at 105° C. not exceeding 5 percent, and having a density between 1.365 and 1.400 grams per cubic centimeter.

2. The film structure of claim 1 wherein the average angle of the long axes of the crystallites in the stretched film is less than about 25° with respect to the direction of predominant orientation.

3. A nonfibrillating, heat-set and dimensionally stabilized film structure of polyethylene terephthalate having an intrinsic viscosity of at least 0.65 and physical properties bounded by irregular volume AB'C'DEF'G'H in FIG. 6a.

4. The film of claim 1 having a coating on at least one side thereof.

5. The film of claim 4 wherein the coating is an adhesive composition.

6. The film of claim 1 coated with a composition containing magnetizable particles.

7. The film of claim 4 wherein the coating is metallic coating.

* * * * *

PO-1050
(5/69)

UNITED STATES PATENT OFFICE
CERTIFICATE OF CORRECTION

Patent No. 3,627,579   Dated December 14, 1971

Inventor(s)   Carl John Heffelfinger

It is certified that error appears in the above-identified patent and that said Letters Patent are hereby corrected as shown below:

Column 2, line 40, "the" should be deleted and --a typical-- inserted.
Column 3, line 69, "diction" should read --direction--.
Column 4, line 27, after "intrinsic" the word --viscosity-- should be inserted.
Column 5, line 5, "marking" should read --making--.
Column 5, line 14, "leas on" should read --least one--.
Column 5, line 46, "na" should read --an--.
Column 6, lines 32, 49, 57 and 58, the sigmas are omitted.
Column 7, line 11, at the end of the line, "the" should read --be--
Column 7, line 25, "Fig." should read --relationship--.
Column 7, line 25, "5.5X" should read --density--.
Column 7, line 28, "4.X" and "5.X" should read --4.0X-- and --5.0X--.
Column 7, line 34, "and" should be omitted.
Column 7, line 43, "FIG." should read --FG--.
Column 8, line 38, "25 percent" should read --15 percent--.
Column 9, Table 1, fifth column, "Transverse disection" should read --Transverse direction--; and in the sixth column, "km.-cm./mil." should read --kg.-cm./mil.--.
Column 11, line 7, "its" should read --it is--.
Column 11, fourth column, "0.73" should read --0.72--.
Column 12, line 14, a parenthesis should be inserted before "filled", second occurrence.
Column 12, line 25, "derivation" should read --derivative--.
Column 12, line 36, at the end of the line, "is" should read --in--.

Signed and sealed this 11th day of July 1972.

(SEAL)
Attest:

EDWARD M. FLETCHER, JR.
Attesting Officer

ROBERT GOTTSCHALK
Commissioner of Patents